(12) United States Patent
Barkand

(10) Patent No.: US 7,514,156 B1
(45) Date of Patent: Apr. 7, 2009

(54) LAYERED ARTICLE

(75) Inventor: James W. Barkand, Sparta, NJ (US)

(73) Assignee: Precision Manufacturing Group, LLC, Cedar Grove, NJ (US)

( * ) Notice: Subject to any disclaimer, the term of this patent is extended or adjusted under 35 U.S.C. 154(b) by 332 days.

(21) Appl. No.: 11/226,074

(22) Filed: Sep. 14, 2005

Related U.S. Application Data

(60) Provisional application No. 60/609,793, filed on Sep. 14, 2004.

(51) Int. Cl.
*B32B 15/01* (2006.01)
*A61C 13/00* (2006.01)

(52) U.S. Cl. .................................... 428/672; 433/200.1

(58) Field of Classification Search ............... 428/672, 428/213, 215, 332, 336, 610; 164/35, 137, 164/45, 246; 205/181, 72, 73; 433/200.1
See application file for complete search history.

(56) References Cited

U.S. PATENT DOCUMENTS

| 4,343,684 | A | 8/1982 | Lechtzin |
| 4,676,751 | A | 6/1987 | Shoher et al. |
| 4,791,017 | A | 12/1988 | Hofmann et al. |
| 4,869,971 | A | 9/1989 | Nee et al. |
| 5,051,317 | A | 9/1991 | Solidum |
| 5,223,321 | A * | 6/1993 | Sinnadurai et al. .......... 428/138 |
| 5,270,098 | A | 12/1993 | Priester et al. |
| 5,393,405 | A | 2/1995 | Iacono et al. |
| 5,832,601 | A * | 11/1998 | Eldridge et al. ............... 29/843 |
| 6,093,157 | A * | 7/2000 | Chandrasekaran .......... 600/585 |
| 6,355,363 | B1 | 3/2002 | Herklotz et al. |
| 6,630,876 | B1 | 10/2003 | Noyes et al. |

FOREIGN PATENT DOCUMENTS

JP            05-063331       *  3/1993

* cited by examiner

*Primary Examiner*—Timothy M Speer
*Assistant Examiner*—Gordon R Baldwin
(74) *Attorney, Agent, or Firm*—McCarter & English, LLP

(57) ABSTRACT

A multi-layered article includes first and second external layers of soft electroplated gold material. An intermediate layer of hard electroplated gold material is arranged between the first and second external layers. Each of the layers has a substantially uniform thickness.

11 Claims, 4 Drawing Sheets

LAYERED ARTICLE

CROSS-REFERENCE TO RELATED APPLICATION

This application claims the priority of U.S. Provisional Patent Application No. 60/609,793 filed Sep. 14, 2004, the disclosure of which is incorporated herein by reference in its entirety.

FIELD OF THE INVENTION

The present invention relates to electroforms and, more particularly, to electroforms including one or more layers of gold.

BACKGROUND OF THE INVENTION

Multiple metal layers can be electroplated or electrodeposited on a removable mandrel to produce a precision electroform. Such electroforms commonly consist of Copper, Nickel or other base metals, but can also include noble or precious metals, such as Gold, Silver, Platinum, Palladium, etc. For example, gold materials are increasingly being incorporated in precision electroforms across a wide variety of fields and applications. Soft gold materials in a freestanding electroform can tend to deform plastically, or take a "set", when subjected to mechanical stress. Hard gold materials in such an electroform, though stiffer in relation to soft gold materials, can tend to be brittle and/or develop cracks due to high levels of internal stress, which cracks can thereafter propagate via fatigue, especially when the electroform is being used as a dynamic component that is exposed to cyclic mechanical stress. Novel electroforms which incorporate gold materials in a manner which avoids the above-mentioned problems associated with gold materials are therefore desirable, as are novel methods for fabricating such electroforms.

SUMMARY OF THE INVENTION

In accordance with the present invention, a multi-layered article includes first and second external layers of soft electroplated gold material. An intermediate layer of hard electroplated gold material is arranged between the first and second external layers. The first external layer has a thickness which is substantially uniform to the thickness of the second external layer and to the thickness of the intermediate layer.

BRIEF DESCRIPTION OF THE DRAWINGS

For a more complete understanding of the present invention, reference is made to the following detailed description of exemplary embodiments of the present invention, considered in conjunction with the accompanying drawings, in which.

DETAILED DESCRIPTION OF THE INVENTION

Although the present invention can be used in conjunction with many different types of applications related to a variety of fields, it is particularly suitable for use in connection with the medical field. More particularly, the present invention has been successfully used in the field of hearing restoration, wherein articles constructed in accordance with the present invention have been incorporated as components of surgical implants designed for implantation in the human ear. In some such applications, articles constructed in accordance with the present invention, in addition to displaying superior corrosion resistance, also perform specialized functions by virtue of such articles featuring a particularly advantageous combination of inherent dynamic and static mechanical properties. Accordingly, the present invention will be described hereinafter in connection with such a medical implant application. It should be understood, however, that the following description is meant to be illustrative of the present invention and is not meant to limit the scope of the present invention, which has utility in other types of applications, both in the medical field, as well in many other fields, such as the scientific, industrial, commercial, and/or military fields, etc.

Figure 1:
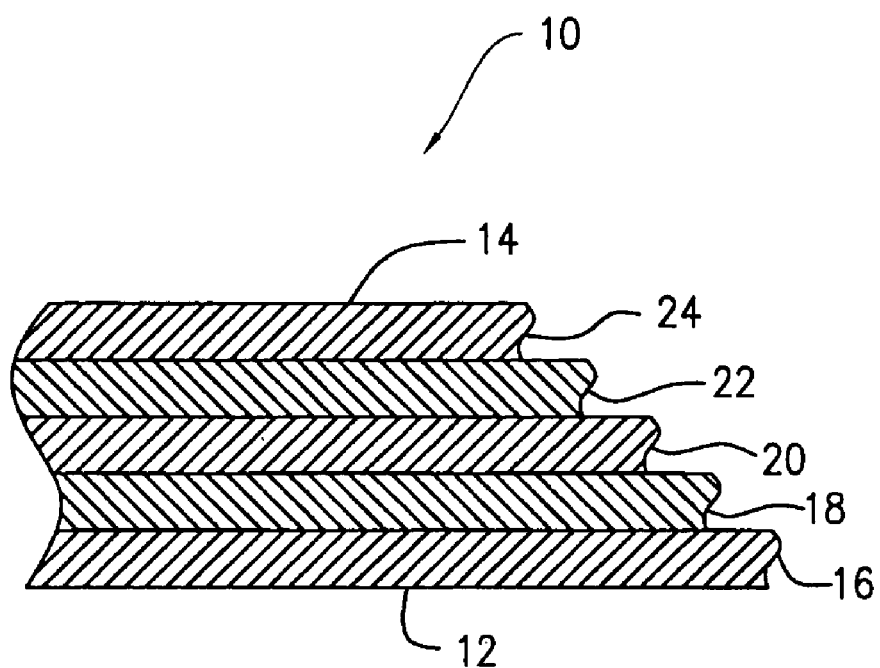
FIG. 1 is a schematic cross-sectional elevational view of a layered article constructed in accordance with the present invention.

Referring to FIG. 1, there is shown a layered article 10 constructed in accordance with the present invention. The layered article 10, which for present purposes may be considered to have an arbitrary shape, is shown in cross-section in FIG. 1, so as to reveal a multi-layer construction, the function, purpose, and significance of which will be described hereinafter.

The layered article 10 includes a first external surface 12, a second external surface 14 opposite the first external surface 12, and numerous layers disposed therebetween. Although the layered article 10 is shown in FIG. 1 to include five layers, it will be understood that the number of layers may be less or more than five, e.g., three, seven, ten or more, etc.

Coextensive with the first external surface 12 of the layered article 10 is a first layer 16 consisting of soft gold. Immediately adjacent to the first layer 16 is a second layer 18 consisting of hard gold. Immediately adjacent to the second layer 18 is a third layer 20 consisting of soft gold. Following the third layer 20, and immediately adjacent thereto, is a fourth layer 22 of hard gold. Finally, a fifth layer 24 of soft gold is immediately adjacent to the fourth layer 22. The fifth layer 24 is coextensive with the second external surface 14. The thickness of each of the first, second, third, fourth and fifth layers 16, 18, 20, 22, 24 is substantially uniform and is in a range of from about 1 µm to about 5 µm (i.e., 40 to 200 microinches). The thickness of the layered article 10, being an additive function of the thicknesses of its layers, is in a range of from about 5 µm to about 25 µm.

Figure 2:
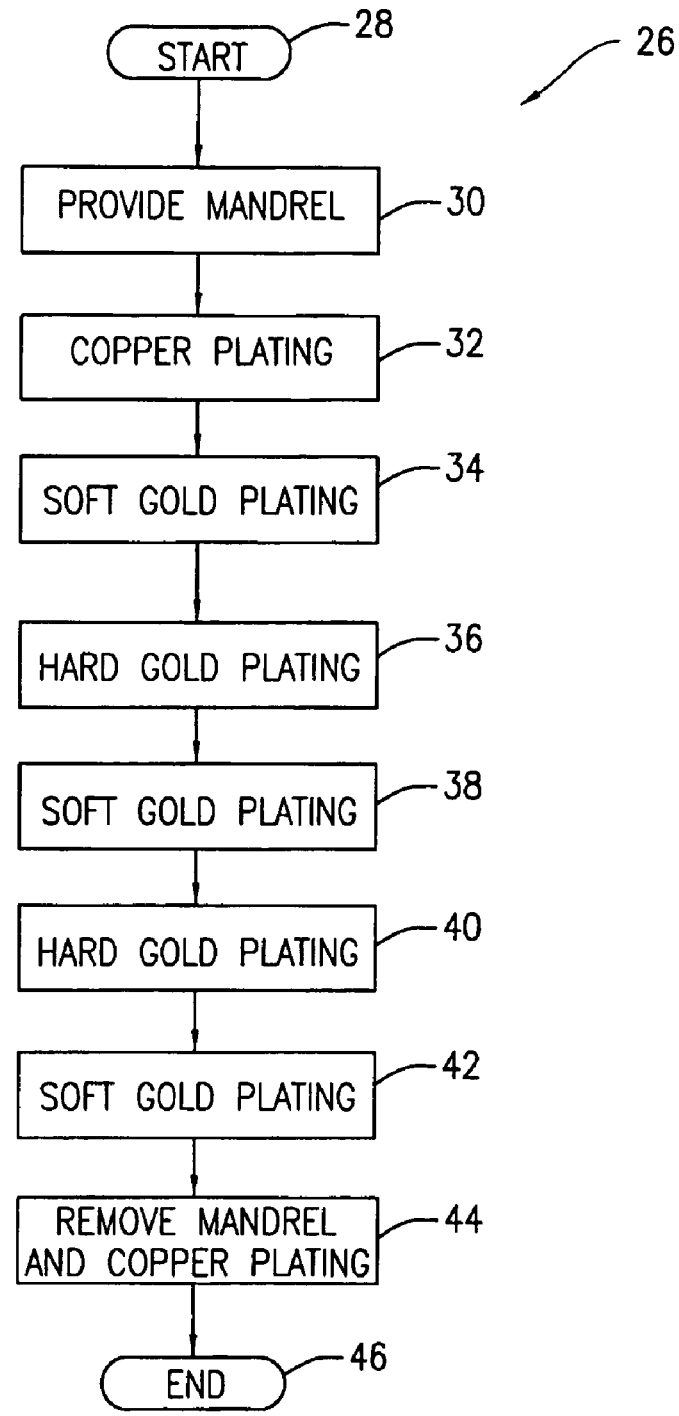
FIG. 2 is a flowchart of a method of fabricating the layered article of FIG. 1.
Figure 3A:
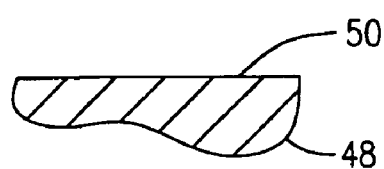
FIGS. 3A-3G are schematic cross-sectional elevational views corresponding to various steps in the method of FIG. 2.
Figure 3B:
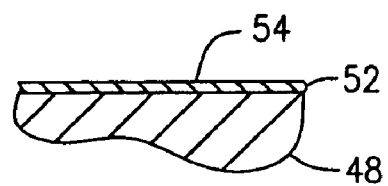
Figure 3C:
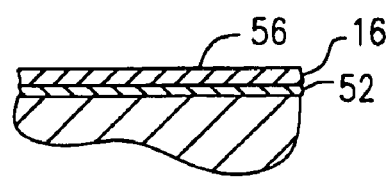
Figure 3D:
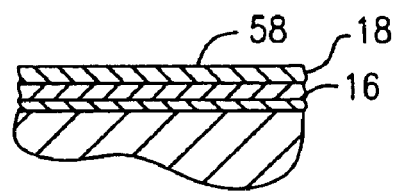
Figure 3E:
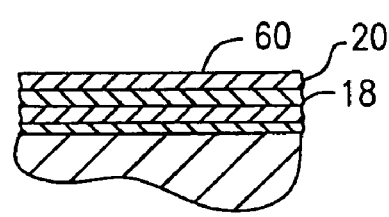
Figure 3F:
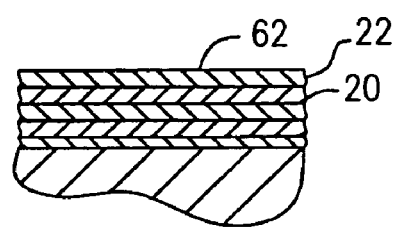
Figure 3G:
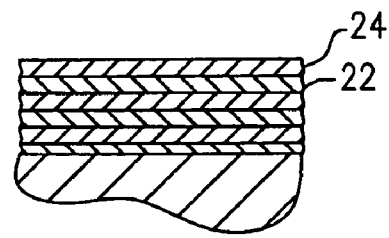

The layered article 10 may be produced by an inventive fabrication method to be described now with joint reference to FIGS. 2-3G. FIG. 2 is a flowchart of an inventive fabrication method 26 that consists of steps 28, 30, 32, 34, 36, 38, 40, 42, 44 and 46, and that may be employed to fabricate the layered article 10. FIGS. 3A-3G are cross-sectional views used herein to illustrate various steps of the fabrication method 26.

With reference to FIG. 2, the fabrication method 26 starts at step 28. In step 30, a mandrel 48 is provided (see FIG. 3A). The mandrel 48 is made from electrically conductive aluminum, and includes an external plating surface 50 shaped according to the desired shape of the article being fabricated. For example, the mandrel 48 may be machined down from a larger block of aluminum so as to create the approximate shape desired for the external plating surface 50. The mandrel is mounted to a plating rack (not shown) such that the external plating surface 50 is exposed for electroplating thereon.

Then, in step 32, the external plating surface 50 of the mandrel 48 is submerged in a copper-containing solution and a thin (e.g., in a range of from about 10 microinches to about 50 microinches thick) layer 52 of copper is deposited onto the external plating surface 50 (see FIG. 3B). The copper layer 52 provides a surface 54 upon which to efficiently deposit gold material.

Thereafter, in step 34, the surface 54 of the copper layer 52 is submerged in an electroplating bath containing a pure gold electroplating process for producing a soft gold deposit per ASTM B 488-01, Type III, Code A (e.g., the E-56 pure gold electroplating process supplied by Technic Inc.). The electroplating bath further contains gold salts and other known components in an aqueous solution. The temperature of the bath is approximately 1500 Fahrenheit. Using a plating current density of approximately 1 to 1.2 amps/square foot, and a plating time of approximately thirty minutes, the first layer 16 of soft gold is deposited on the surface 54 of the copper layer 52 (see FIG. 3C). The first layer 16 of soft gold provides a surface 56 upon which to deposit additional material.

Next, in step 36, the surface 56 of the first layer 16 of soft gold is submerged in an electroplating bath containing a gold electroplating process for producing a hard gold deposit per ASTM B 488-01, Type I, Code C (e.g., the Orosene 999 gold electroplating process supplied by Technic Inc.). The electroplating bath further contains gold salts and other known components in an aqueous solution. The temperature of the bath is approximately room temperature. Using a plating current density of approximately 1 to 1.2 amps/square foot, and a plating time of approximately one hour, the second layer 18 of hard gold is deposited on the surface 56 of the first layer 16 of soft gold (see FIG. 3D). The second layer 18 of hard gold provides a surface 58 upon which to deposit additional material.

Then, in step 38, the surface 58 of the second layer 18 of hard gold is submerged in an electroplating bath of a composition and temperature as described above with reference to step 34. Using a plating current density of approximately 1 to 1.2 amps/square foot, and a plating time of approximately thirty minutes, the third layer 20 of soft gold is deposited on the surface 58 of the second layer 18 of hard gold (see FIG. 3E). The third layer 20 of soft gold provides a surface 60 upon which to deposit additional material.

Thereafter, in step 40, the surface 60 of the third layer 20 of soft gold is submerged in an electroplating bath of a composition and temperature as described above with reference to step 36. Using a plating current density of approximately 1 to 1.2 amps/square foot, and a plating time of approximately one hour, the fourth layer 22 of hard gold is deposited on the surface 60 of the third layer 20 of soft gold (see FIG. 3F). The fourth layer 22 of hard gold provides a surface 62 upon which to deposit additional material.

Next, in step 42, the surface 62 of the fourth layer 22 of hard gold is submerged in an electroplating bath of a composition and temperature as described above with reference to step 34. Using a plating current density of approximately 1 to 1.2 amps/square foot, and a plating time of approximately thirty minutes, the fifth layer 24 of soft gold is deposited on the surface 62 of the fourth layer 22 of hard gold (see FIG. 3G).

Then, in step 44, the aluminum mandrel 48 is removed from the plating rack (not shown) and the aluminum mandrel 48 and the copper layer 52 are removed via a chemical dissolution. The result, i.e., layered article 10 (see FIG. 1), is a free-standing electroform component consisting substantially entirely of alternating layers of hard and soft electroplated gold material. The fabrication method 26 ends at step 46.

Figure 4:
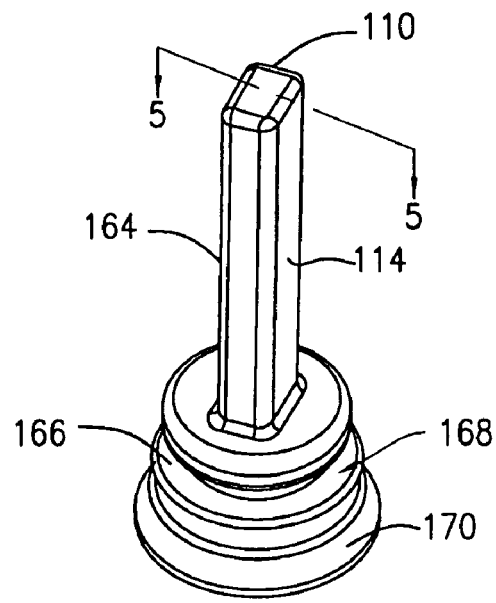
FIG. 4 is a perspective view of a variation of the layered article of FIG. 1.
Figure 5:
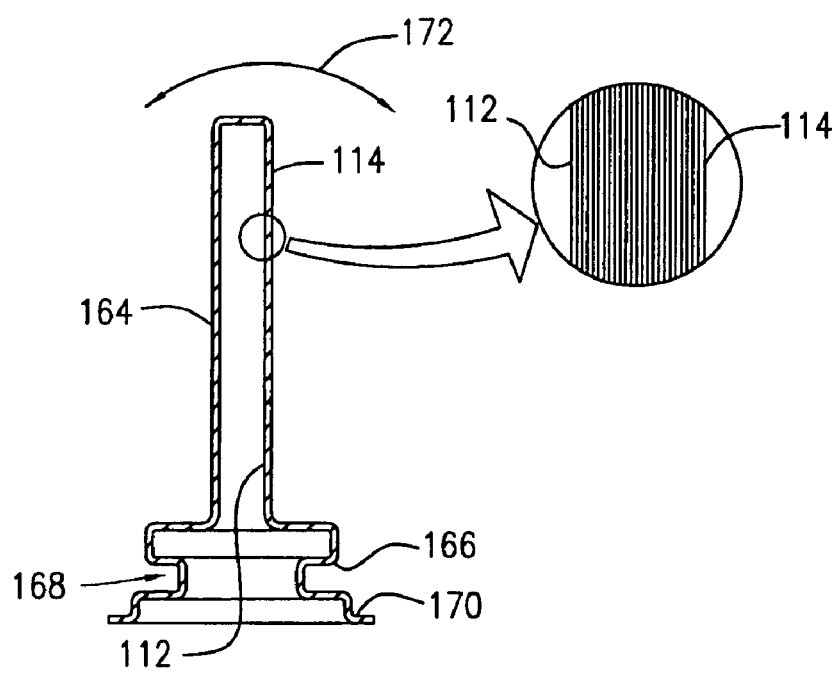
FIG. 5 is a cross-sectional elevational view, taken along section line 5-5 of FIG. 4, of the layered article depicted in FIG. 4.

It should be appreciated that the layered article 10 and/or the fabrication method 26 for producing the layered article 10 provide numerous advantages over common electroform articles and electroforming methods for producing the same. To facilitate the following discussion of such advantages, a variation of the layered article 10 is shown in FIGS. 4 and 5. Elements illustrated in FIGS. 4 and 5 which correspond substantially to the elements described above with respect to FIGS. 1-3G have been designated by corresponding reference numerals increased by one hundred. The article shown in FIGS. 4 and 5 operates and is constructed in manners consistent with the foregoing description of the layered article 10 shown in FIGS. 1 and 3A-G, unless it is stated otherwise.

In FIGS. 4 and 5, there is shown a layered article 110 constructed in accordance with the present invention, and suitable for use in an implantable assembly (not shown) for human hearing restoration. Referring to FIGS. 4 and 5, the layered article 110 is in the form of an unitary component of complex shape including the following components: a cantilevered arm 164; bellows 166, including at least one convolution 168; and a flange 170, wherein both a first surface 112 and a second surface 114 of the layered article 110 are substantially continuous as well as coextensive with each of such components. The layered article 110 consists of approximately 25 layers (which layers are shown in FIG. 5 to extend vertically, but which more generally follow the complementary contours of the first and second surfaces 112, 114 of the layered article 110) of electroplated gold, alternating between soft and hard gold layers in a similar manner as that of the layered article 10 of FIG. 1. All of the hard and soft gold layers of the layered article 110 are of substantially the same thickness (e.g., a thickness in a range of from about 50 microinches to about 100 microinches). To produce soft and hard gold layers of similar thickness in this range, the layered article 110 is fabricated according to the fabrication method 26 illustrated in the flowchart of FIG. 2 and described above, with the understanding that the alternating soft and hard gold plating steps (e.g., steps 34 and 36) would be repeated enough times to achieve a desired overall thickness of approximately 2.4 mils. As with the layered article 10 of FIGS. 1-3G, each of the first and second surfaces 112, 114 of the layered article 110 is coextensive with a layer of soft gold, and intermediate layers of the layered article 110 alternate between soft and hard gold compositions.

The layered article 110 can be securely coupled to a hub (not shown) via the flange 170, wherein the hub and the layered article are part of a device (not shown) which is implantable in the human ear for purposes of hearing restoration. In operation of such a device, vibrations can be generated electronically by components (not shown) coupled to the hub and enclosed within the layered article 110, which vibrations then pass into the cantilevered arm 164 via the first surface 112. Such vibrations cause the cantilevered arm 164 to undergo oscillation, e.g., oscillation along a direction indicated by arrow 172 in FIG. 5. Airborne sound waves are thus generated by the cantilevered arm 164 which are passed outward into the ear canal via surface 114. The bellows 166, being laterally flexible via the convolution 168, enables the cantilevered arm 164 to undergo such oscillation in a manner which helps to prevent undue stress from arising, and/or crack-causing fatigue from occurring, in the layered article 110.

As was mentioned earlier, the layered article 10 and/or the fabrication method 26 for producing the layered article 10 provide numerous advantages over common electroform articles and electroforming methods for producing the same. The same advantages accrue to the layered article 110 as just described. For example, the above-described fabrication method 26 involves plating both the hard and soft gold layers at a relatively low current density so as to improve the quality of the gold deposits. Especially with respect to the hard gold layers, this fosters the production of a laminar interlayer structure characterized by a relatively fine grain structure (e.g., grains of 200 Angstroms across or less), minimal porosity, and a relatively low level of internal stress. Further, this enhances bonding between the adjacent hard and soft gold layers, since interlayer communication is enhanced and gaps or voids between layers are effectively minimized. Still further, this encourages uniformity in the thickness of a given gold layer (e.g., such that the layer has substantially the same thickness wherever on the layered article 10, or on the layered article 110, the layer thickness is measured).

The provision of soft gold layers coextensive with the first and second external layers 112, 114 of the layered article 110 enhances (i) the capacity of the layered article 110 to be bonded (e.g., at its flange 170) to other structures, (ii) the corrosion resistance of the component, and (iii) the compatibility of the component with living tissue (e.g., via avoidance of autoimmune rejection). The presence of significant amounts of hard gold in the corresponding internal layers results in the layered article 110 exhibiting an increased overall hardness and stiffness (i.e., versus what would be exhibited by a similar component consisting of pure soft gold), thereby improving the durability and dimensional stability of the layered article 110. The hard gold content of the layered article 110 further provides sufficient stiffness and strength so as to generate a useful degree of spring force when the layered article 110 is flexed and/or vibrated (e.g., the same performance would be effectively impossible in a part consisting solely of soft gold).

In part because the hard gold layers of the layered article 110 are each kept below about 100 microinches in thickness, the risk of delamination and/or exfoliation of each hard gold layer (either during or immediately after that layer's deposition) is substantially reduced. In addition, the relative thinness in the hard gold layers within the finished layered article 110 enhances overall flexibility and reduces the amount of stress cyclically imparted to each hard gold layer (e.g., especially along the bellows convolution 168) during vibration-induced flexure of the layered article 110. Further, the presence of soft gold layers firmly bonded to both sides of each hard gold layer may beneficially counteract at least a portion of the internal stress in the hard gold. At least in part because of these characteristics, the layered article 110 is suitable for use as a flexible, dynamic and durable component of a surgical implant (e.g., such as the device described above with reference to FIGS. 4 and 5).

Referring again to FIGS. 1 and 3A-G, further variations of the layered article 10 are possible. For instance, the thickness of any and/or all of the gold layers of the layered article 10 can be varied, according to the application in which the layered article 10 will be used and/or the mechanical properties (e.g., hardness, stiffness, etc.) required to be exhibited by the layered article 10. For example, an increased stiffness requirement may necessitate a greater relative thickness in one or more of the hard gold layers as compared to the soft gold layers, whereas in cases in which stiffness is not a concern, relatively thicker soft gold layers may be specified. Relative variation in baseline thickness among soft gold layers and/or among hard gold layers may also be allowable and/or desirable. Additionally, or in the alternative, one or more of the hard and/or soft gold layers of the layered article 10 can be thicker than about 100 microinches, and/or thinner than about 50 microinches, depending upon the application. The same potential for variations exists in the layered article 110 of FIGS. 4 and 5.

As mentioned above, and as illustrated in FIGS. 4 and 5, the total number of gold layers in the layered article 10 can be increased or decreased. For instance, the layered article 10 can have three layers (i.e., one hard gold layer between two soft gold layers), or many more layers than five (see, e.g., the layered article 110 of FIGS. 4 and 5). For example, the requirements of a particular application may require the overall thickness of the layered article 10 to meet a certain minimum thickness (e.g., so as to achieve compatibility with an adjacent and/or adjoining part, to provide for a relatively large spring force, etc.). In such circumstances, the number of alternating hard and soft gold layers may be increased as necessary (e.g., to provide as many as thirty or more such layers) in order to achieve the desired thickness.

Hard gold layers may be provided coextensive with one or both of the first and second external surfaces 12, 14 of the layered article, thereby inverting the order of such layers described above with respect to FIGS. 1-3G. Also, layers of one or more other precious metals, such as Ruthenium, Osmium Rhodium, Iridium, Palladium, Platinum, or Silver may also be used in replacement of, and/or in addition to, one or more of the layers of hard and/or soft gold. One or more base metal layers may also appear in such an electroform in some applications. For example, this may result in a layered article consisting at least partially, or even solely, of multiple layers of noble or precious metals and having a different pattern of alternation (e.g., a repeating pattern of three or more different layers, no apparent pattern of alternation, etc.) than that of the layered article 10.

It will be understood that the embodiments of the present invention described herein are merely exemplary and that a person skilled in the art may make many variations and modifications without departing from the spirit and scope of the invention. For example, the plating current densities used in the creation of the soft and/or hard gold layers can be higher or lower than the current density range specified herein (e.g., 0.9 amps/square foot or lower, up to 2.5 amps/square foot or greater, etc.). Also, other types of soft and/or hard gold materials may be used for the corresponding soft and hard gold layers than those specified herein (e.g., compositions having different purities, non-standard compositions, etc.). All such variations and modifications, including those discussed above, are intended to be within the scope of the present invention as defined in the appended claims.

What is claimed is:

1. A multi-layered article comprising a first external layer of soft electroplated gold material; a second external layer of soft electroplated gold material; and an intermediate layer of a hard electroplated gold material, said intermediate layer being arranged between said first and second external layers, said first external layer, said second external layer, and said intermediate layer forming a dynamic electroform component, said first external layer, said second external layer, and said intermediate layer forming a cantilevered arm, said first external layer, said second external layer, and said intermediate layer forming a bellows including a convolution, said bellows arranged below said cantilevered arm, and said first external layer, said second external layer, and said intermediate layer forming a flange arranged below said convolution.

2. The multi-layered article of claim 1, wherein said electroform component is flexible.

3. The multi-layered article of claim 2, wherein said electroform component has minimal porosity.

4. The multi-layered article of claim 3, wherein said electroform component is durable.

5. The multi-layered article of claim 1, wherein said intermediate layer has a thickness of approximately 100 microinches.

6. The multi-layered article of claim 1, wherein said first external layer, said second external layer, and said intermediate layer form a cantilevered arm.

7. The multi-layered article of claim 1, wherein said bellows and said convolution are sized to oscillate and generate spring force.

8. The multi-layered article of claim 7, wherein said bellows and said convolution are laterally and axially flexible.

9. The multi-layered article of claim 1, wherein said first external layer, said second external layer, and said intermediate layer form a surgical implant component.

10. The multi-layered article of claim 1, wherein said first external layer, said second external layer, and said intermediate layer form a medical implant component.

11. A multi-layered article for industrial applications comprising a first external layer of soft electroplated gold material; a second external layer of soft electroplated gold material; and an intermediate layer of a hard electroplated gold material, said intermediate layer being arranged between said first and second external layers, said first external layer, said second external layer, and said intermediate layer forming a dynamic electroform component having superior corrosion resistance, said first external layer, said second external layer, and said intermediate layer forming a cantilevered arm, said first external layer, said second external layer, and said intermediate layer forming a bellows including a convolution, said bellows arranged below said cantilevered arm, and said first external layer, said second external layer, and said intermediate layer forming a flange arranged below said convolution.

* * * * *

UNITED STATES PATENT AND TRADEMARK OFFICE
CERTIFICATE OF CORRECTION

| | | |
|---|---|---|
| PATENT NO. | : 7,514,156 B1 | Page 1 of 1 |
| APPLICATION NO. | : 11/226074 | |
| DATED | : April 7, 2009 | |
| INVENTOR(S) | : James W. Barkand | |

It is certified that error appears in the above-identified patent and that said Letters Patent is hereby corrected as shown below:

Column 3, line 17, "1500" should be --150°--.

Signed and Sealed this

Sixth Day of October, 2009

David J. Kappos
*Director of the United States Patent and Trademark Office*